United States Patent [19]

Connolly et al.

[11] Patent Number: 5,231,827
[45] Date of Patent: Aug. 3, 1993

[54] LAWN AND GARDEN CHIPPER SHREDDER VACUUM APPARATUS

[75] Inventors: Kevin J. Connolly, Ballston Lake, N.Y.; George W. Bingley, Kankakee, Ill.; Charles C. Wicker, Johnsonville, N.Y.; Karl K. Holt, Hartland, Wis.

[73] Assignee: Garden Way Incorporated, Troy, N.Y.

[21] Appl. No.: 795,516

[22] Filed: Nov. 21, 1991

[51] Int. Cl.⁵ .................. A01D 34/68; B02C 18/10
[52] U.S. Cl. ..................................... 56/13.1; 56/13.4; 56/16.9; 56/320.2; 56/DIG. 8; 56/DIG. 9; 241/101.1; 241/101.7
[58] Field of Search .................. 56/16.9, 1, 13.1, 13.4, 56/255, 295, 320.1, 320.2, DIG. 8, DIG. 9; 241/101.1, 101.7

[56] References Cited

U.S. PATENT DOCUMENTS

| | | | |
|---|---|---|---|
| Re. 29,139 | 2/1977 | Messner | 56/13.1 |
| 3,802,171 | 4/1974 | Cousino | 56/13.4 |
| 3,808,782 | 5/1974 | McWilliams | 56/16.9 |
| 3,968,938 | 7/1976 | Ruhl et al. | 241/101.1 |
| 4,083,166 | 4/1978 | Haas | 56/13.7 |
| 4,263,771 | 4/1981 | Iaboni et al. | 56/13.4 |
| 4,796,416 | 1/1989 | Bendig et al. | 241/101.1 X |

*Primary Examiner*—Terry Lee Melius
*Attorney, Agent, or Firm*—Hayes & Reinsmith

[57] ABSTRACT

Lawn and garden maintenance equipment for collecting and shredding debris and chipping branches is provided with a wheel-supported housing having a handle for guiding the apparatus, the housing having a substantially closed bottom wall below the blades and having a portion thereof providing an air and debris inlet opening, a motor mounted on the housing with a shaft extending into housing and supporting a disc for rotation with the shaft within said housing, the disc having a cutter on its top for slicing limbs and a slot adjacent said cutting means to permit sliced material to pass through the disc, downwardly extending blades mounted on the bottom of the disc move air and air entrained debris within the housing to an exit opening in said housing generally opposite the inlet for air and entrained debris, and a top opening in the housing is radially aligned with the cutter to accept limbs and the like to be fed through the opening to be engaged by the cutter.

14 Claims, 4 Drawing Sheets

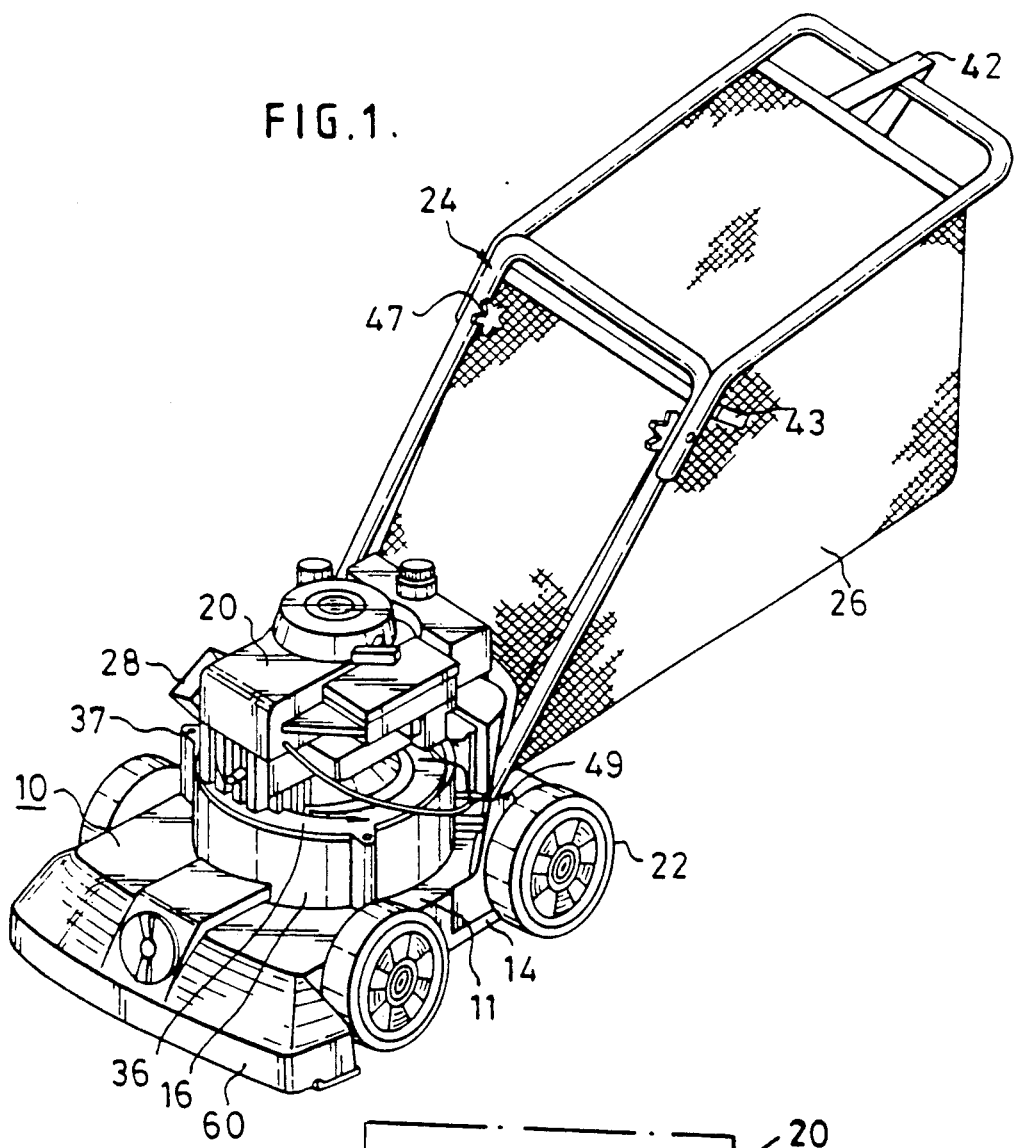
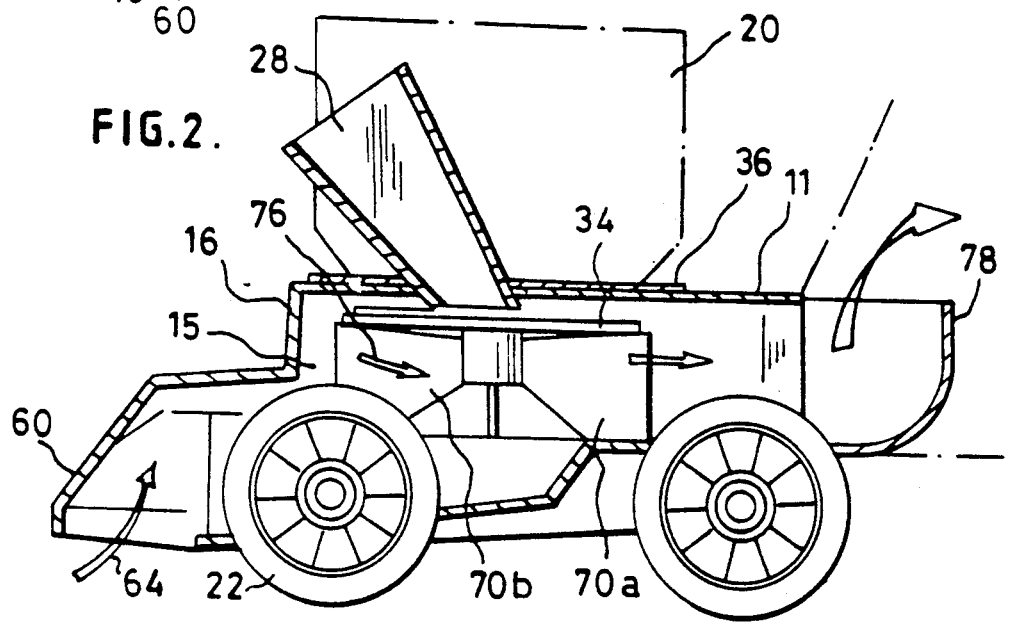

LAWN AND GARDEN CHIPPER SHREDDER VACUUM APPARATUS

FIELD OF INVENTION

This invention generally relates to lawn and garden maintenance equipment and is more particularly directed to debris collection equipment for smaller property owner use.

BACKGROUND OF THE INVENTION

Equipment for vacuuming debris, blowing debris and bagging of collected debris, etc. are well known in the property maintenance art and it is not uncommon to combine certain desired functions in a single machine. U.S. Pat. No. 3,968,938, for example, shows a single machine intended to bag debris vacuumed through a front nozzle or through an attachment hose and the inventor makes provision for reduction of the debris by the blades of the blower. It is also known to vertically stack lawn cutting, mulching, etc. elements on a single shaft as in U.S. Pat. Nos. 4,083,166 and 4,263,771 with or without accessory bottom covers such as shown in reissue Patent No. RE29139.

It is a primary object of this invention to combine only the activities of branch chipping, leaf and debris shredding, debris collection including vacuuming on a single chassis without requiring use of accessory elements.

It is an additional object of this invention to provide such combined apparatus which is light in weight contains few moving parts fabricated of durable material and of low cost thereby to make the apparatus suitable for maintenance by the small property owner.

It is a still further object of this invention to provide a debris collector intended for home gardening use which avoids the high noise levels normally expected with chipper/shredders thereby improving it suitability for suburban use.

These and other objects will be in part obvious and in part pointed out in more detail hereinafter.

A better understanding of the objects, advantages, features, properties and relations of the invention will be obtained from the following detailed description and accompanying drawings which set forth certain illustrative embodiments and are indicative of the various ways in which the principles of the invention are employed.

SUMMARY OF THE INVENTION

The invention, in a preferred form, provides lawn and garden maintenance which collects and shreds debris and chips branches and the like having a housing with drive means mounted thereon, the drive means having shaft extending vertically into said housing. A disc is mounted on the shaft for rotation within a work chamber in the housing, the disc having a cutting blade mounted on the top of the disc for slicing limbs and a slot adjacent the cutting blade to permit sliced material to pass through the disc. Blades are mounted on the bottom of the disc to move air and air entrained debris within said housing and a housing bottom closure is provided with an opening providing an air and debris inlet. A top inlet is provided in the housing in radial alignment and communication with the cutting blade for accepting limbs an the like to engage the cutting blade. An exit opening in said housing is provided generally opposite the inlet for air and entrained debris with wheels supporting the entire assembly for movement along the ground. Accessories such as bags, air deflectors, inlet hoses etc. are easily accommodated.

As will be apparent to persons skilled in the art, various modifications, adaptations and variations of the foregoing specific disclosure can be made without departing from the teachings of this invention.

IN THE DRAWINGS

FIG. 1 is a perspective view of one embodiment of this invention with a debris collection bag in place.

FIG. 2 is a partial vertical cross-section view of the apparatus of FIG. 1 taken along different lines to show certain details of the invention.

DESCRIPTION OF A PREFERRED EMBODIMENT

Figure 3:
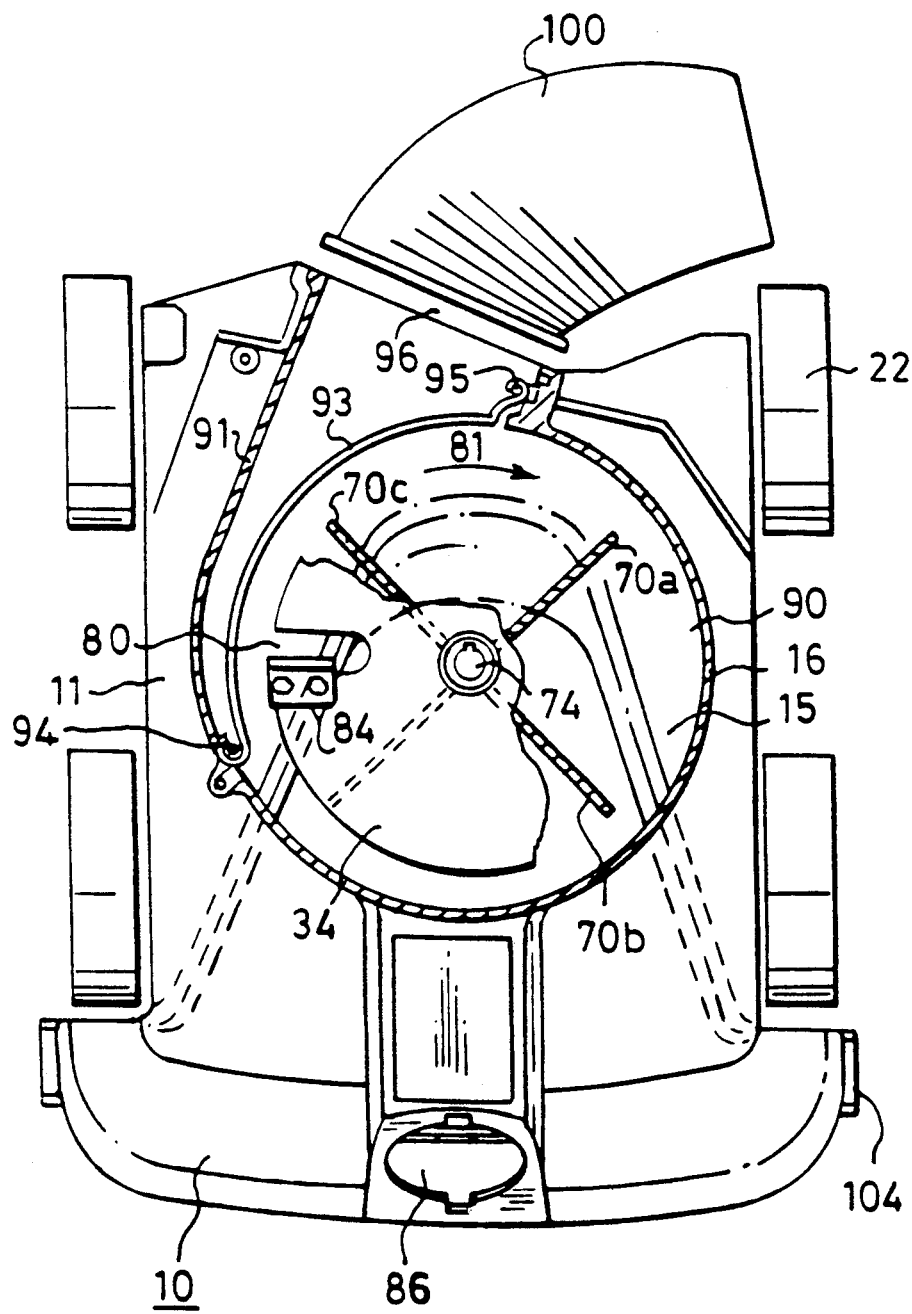
FIG. 3 is a top plan view of the apparatus of FIG. 1 with the bag removed and portion of the housing and disc cut away.

Turning next to the drawings and particularly FIG. 1, it is seen that housing generally designated 10 includes a generally horizontal top deck 11, downwardly extending exterior sidewalls 14 and upwardly extending exterior sidewalls 16 which can be conveniently formed in any desired way including, if desired, casting of a material such as high-density polyethylene. A motor drive assembly generally designated 20 typically including the conventional gasoline motor elements such as a gasoline tank, starter mechanism, etc. is located and supported on the top of a work chamber 15 to be described in greater detail and including sidewalls 16. Wheels 22 are provided to support the apparatus for movement along the ground and a handle bar assembly designated 24 is provided for guiding the apparatus along the ground and for supporting bag 26 on removable mounting straps to collect the debris collected by the apparatus. FIG. 1 also shows the top portion of chipper inlet chute 28.

Figure 5:
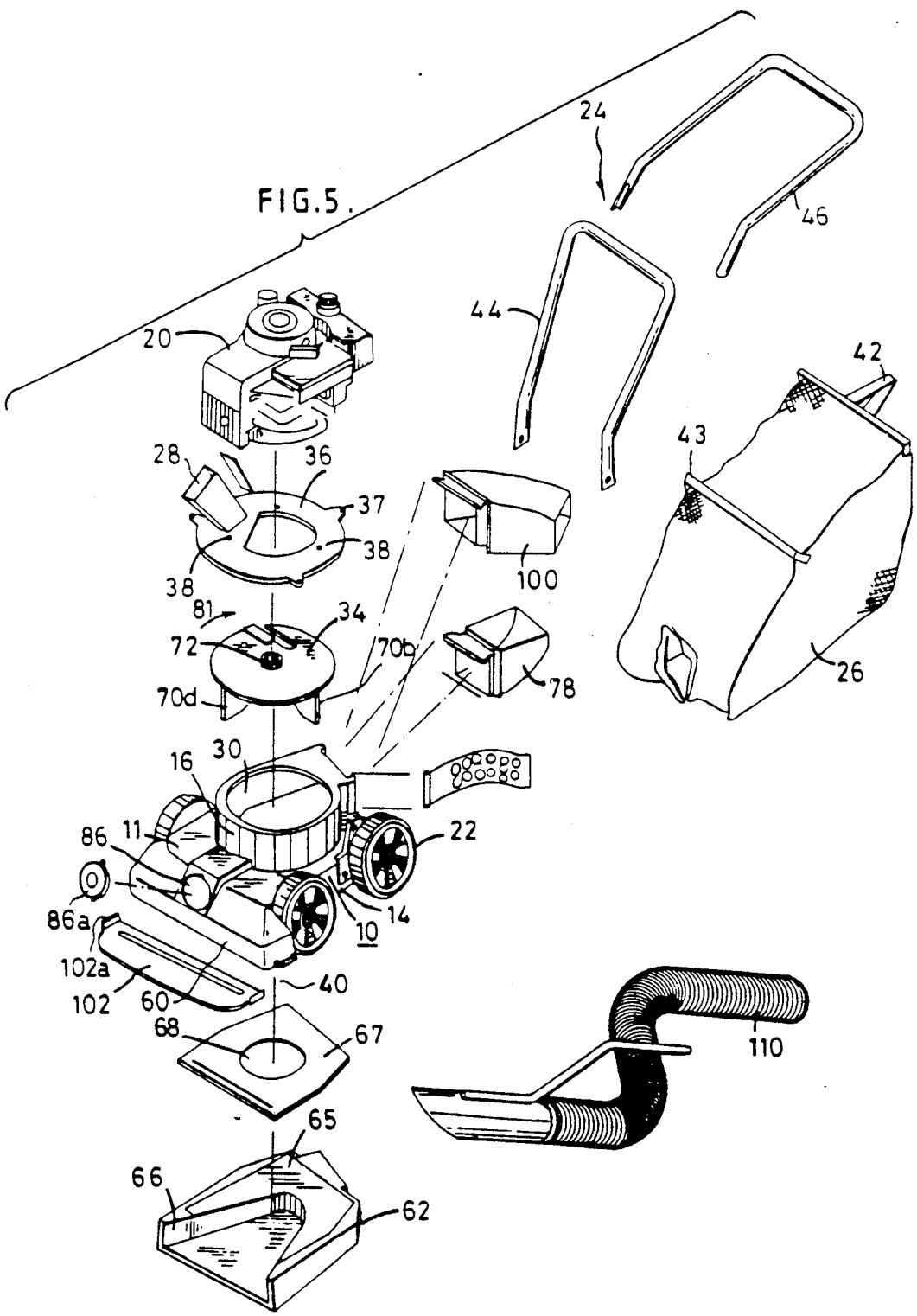
FIG. 5 is an exploded view showing certain primary and alternative parts of the apparatus.

FIG. 5 should be kept in mind when reviewing each of the other drawings, FIG. 5 being an exploded view of the general assembly intended to permit more detailed understanding of the structure of the apparatus. For example, work chamber 15 is shown as having a top aperture 30, which aperture accepts disc 34 made from any suitable rigid material, work chamber 15 being substantially closed by top closure element 36 and work chute 28, top closure 36 having suitable projections 37 for securing it to wall 16. Apertures 38 are provided to mount the motor assembly with its depending motor shaft extending along the center line 40 to drivingly engage disc 34. When viewing FIG. 5 in conjunction with FIG. 1, it is seen that debris collection bag 26 (of any suitable mesh material) is supported on straps 42 and 43 for easy removal from handle assembly 24, which handle assembly is comprised of two elements, bottom portion 44 and rearwardly extending portion 46, suitably secured together at 47 with the lower ends 48 pivotally secured to suitable mounting brackets 49 on the housing 10.

Turning next to FIG. 2 when viewed in connection with the other drawings, it is seen that housing 10 and the depending sidewalls 14 have a forwardly extending "nose" portion 60 which, when taken with the bottom closure 62 suitably secured to housing 11, forms an inlet opening for air and entrained debris and the like as shown at arrow 64. As best seen in FIG. 5 bottom closure 62 has a relieved but elevated area 65 onto which inlet reducer plate 67 is secured, reducer plate 67 being provided with a generally centrally positioned air inlet aperture 68. Reducer member 67 and the bottom plate of closure 62 generally provide an inlet chamber defined by inlet sidewalls 66 of bottom closure 62 and reducer 67 whereby air and entrained materials are efficiently drawn into the work chamber 15.

Before proceeding with the description of the remaining structure of a preferred embodiment, it is believed useful to discuss the provision of the four radially extending blades, suitably secured to the underside of disc 34; these blades have any desired shape that is intended to create the requisite air flow to move material in and through the inlet 64 into work chamber. Those blades generally designated 70a, 70b, 70c and 70d are secured to the disc 34 in any suitable manner, with hub 72 serving as a central point of attachment and coupling to the shaft 74 (see FIG. 3.). Air is moved as shown by the arrows 76 in FIG. 2 to proceed through the work chamber 15 and through the deflector 78 (a removable member for connection to the outlet of work chamber 15) to direct air and entrained material into the bag 26 shown in dotted lines in FIG. 2. The means of attachment of bag 26 to the outlet of the housing is a matter of choice.

Turning now to FIGS. 2 and 3, it is seen that disc 34 (partially cut away in FIG. 3) shows the radially extending blades 70a, 70b, 70c, and 70d with appropriate connection through hub 72 to the motor drive shaft 74. A slot 80 is provided in the disc and, along the trailing edge of that slot on the upper surface and in the direction of rotation of the arrow 81 is a sharpened blade 84 intended to perform the chipping or branch slicing operation. Bottom closure 62 reducer 67 and other elements forming a passageway leading to outlet 96 are generally shown as is front inlet opening 86 for accessory hose use.

As seen best in FIG. 3, work chamber 15 with upstanding housing sidewalls 16 form a generally volute chamber having a circular portion generally designated 90 and a straight wall portion 91. With the direction of the blade rotation in the direction of arrow 81, air is moved toward the exit opening 96. An outlet screen 93 is provided (as desired) and suitably attached to complete the work chamber housing, which screen 93 is removable through use of desired structure including, for example, pins 94 and 95 extending through the housing and suitable sleeves in screen 93. As in conventional technology, the screen assists in breaking up leaves and other materials passing therethrough toward the exit opening 96.

As best seen in FIGS. 2 and 3, chipper blade 84 and its cooperating slot 80 receive materials inserted through the inlet 28, those materials being engaged by the chipper blade 84 which clips off small sections or slices which fall through slot 80 to thereafter exit the housing entrained in air at 96. It should be remembered that air inlet 86 can be left open or can be closed as hereinafter described.

In FIG. 3, there is also illustrated the alternate deflector 100 which is used to direct the exhaust air flow at ground level such as when functioning as a blower and, of course, with the bag removed as hereinafter described.

Figure 4:
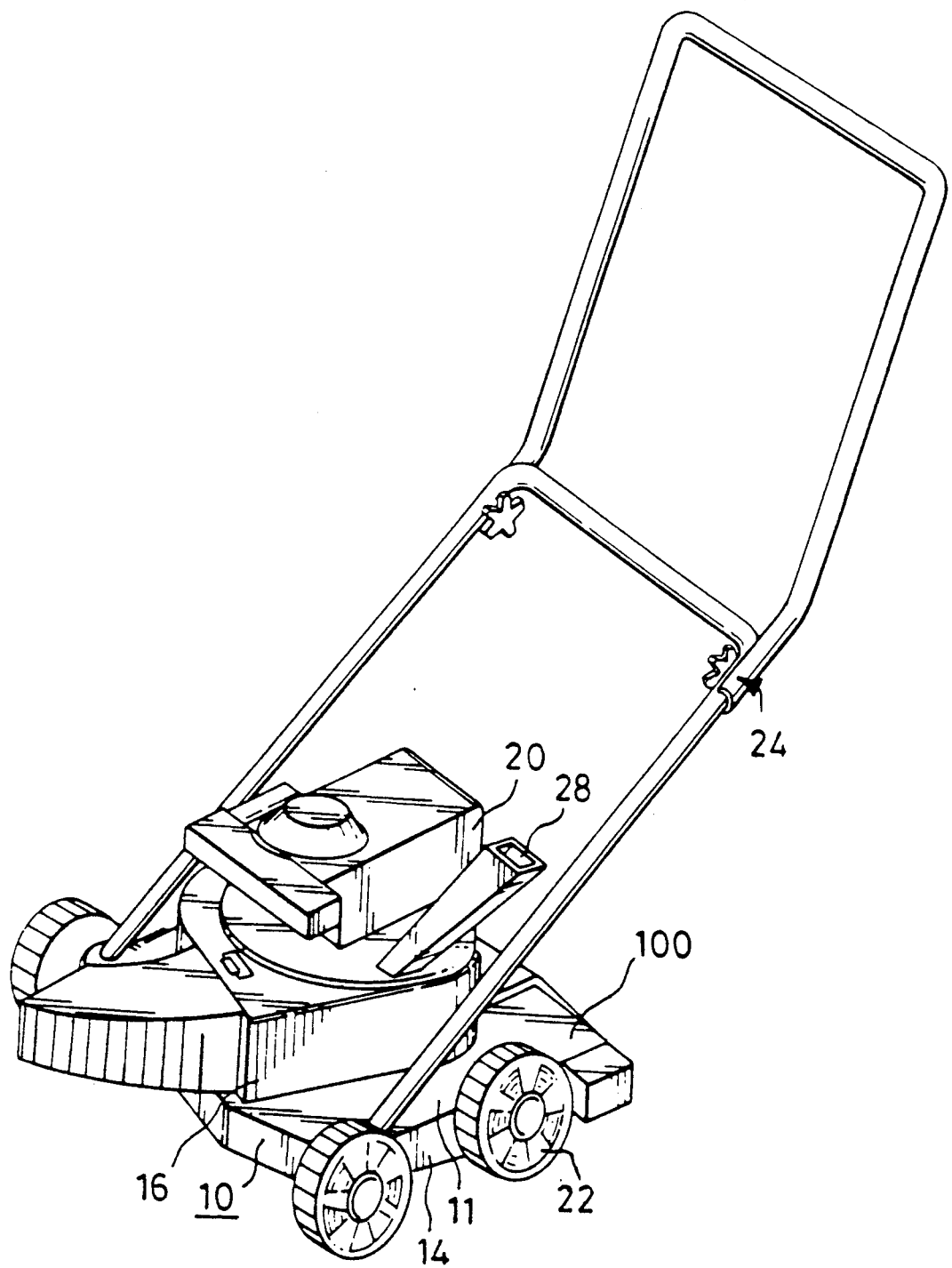
FIG. 4 is a perspective view of an alternative embodiment of the invention.

Turning next to FIG. 4, it is seen that the apparatus of this invention can be provided with an air exhaust outlet 100 and the handle can be folded forward about its housing pivot mounting so as to permit operation of the device as a conventional blower with or without the inlet opening 86 closed by the plug 86a. Also shown in FIG. 4 is the inlet closure plate 102a, which is suitably attached such as by spring clips 102, which engage sidewall projections 104 of inlet nozzle 60 so that, when using the device with hose attachment 110 or when using the device as a blower with the plate in place (as desired), air flow is easily controlled and the outlet can be specifically directed as desired by varying its construction. It is nonetheless clear that by pivoting the handles into the position in FIG. 4, the device can be used as a more conventional blower without requiring debris collection or chipping action.

It should also be noticed that the details of the drive structure have not been shown in the drawings because any suitable source of rotary power can be utilized and hence, a block diagram construction is shown; moreover, arranging to power the wheels is a matter of choice.

The fabrication of this invention is easily accomplished from steel stampings, castings, and the like but the resulting structure is a low cost, light weight and easily used structure suitable for small suburban property home use. While combination functions can be performed, the utilization of accessories is strictly at the election of the user and the basic structure remains exceedingly suitable for chipping and debris collection as well as shredding of the debris as it passes through the blades and the screen of this apparatus.

Although the invention has been illustrated and described with respect to exemplary embodiments thereof, it should be understood by those skilled in the art that various other changes, omissions and additions may be made therein and thereto without departing from the spirit and the scope of the invention.

We claim:

1. Lawn and garden maintenance equipment for collecting and shredding debris as well as chipping branches and the like comprising:
   a housing supported for movement on groud engaging wheels,
   said housing having a top deck portion provided with depending exterior sidewalls extending downwardly from said deck portion and provided with upwardly extending sidewalls from said deck portion and forming the sidewalls of a work chamber;
   a top closure for the work chamber;
   drive means supported on the top closure, said drive means having a shaft rotating about a vertical axis and extending into said work chamber;
   a disc mounted on said shaft for rotation therewith, said disc being disposed proximate to the top closure;
   said disc having generally radially and downwardly extending air moving blades affixed thereto, the tips of said blades being circumferentially spaced from the sidewalls of the work chamber;
   said disc having a slot extending inwardly of the disc circumference and a sharpened chipping blade mounted adjacent the trailing edge of the slot in the direction of rotation and on the top surface of the disc;
   an aperture extending through the top closure of said work chamber and radially positioned to be vertically aligned with said chipper blade at least once each disc revolution;

a bottom closure for said housing engaging the lower edge of the depending sidewalls and secured thereto, said bottom closure substantially closing the housing bottom but being peripherally spaced from the depending sidewalls in one area to create an air and debris inlet opening adjacent the ground;

and an aperture formed in the work chamber as an exit opening for leaves and debris drawn through the inlet into the work chamber by rotation of the disc mounted blades and for the chips removed from twigs and limbs inserted into the upper surface aperture in said top closure.

2. The lawn and garden maintenance equipment of claim 1 wherein four wheels are supported adjacent the downwardly extending sidewalls of the housing and a handle is pivotally supported on the housing for guiding the equipment.

3. The lawn and garden maintenance equipment of claim 2 wherein a debris deflector is positioned in the exit opening and a bag is supported on the handle with the deflector forming the inlet to the bag and with the deflector arranged to deflect exiting debris material upwardly into the bag.

4. The lawn and garden maintenance equipment of claim 3 wherein a screen is removably mounted in the exit opening to assist in reducing the size of leaves exiting therethrough into the bag.

5. The lawn and garden maintenance equipment of claim 2 wherein an aperture is provided in the front depending sidewall said aperture being suitable to be closed by a removable plug and upon plug removal to accept a debris inlet hose and a removable closure is used to close the air and debris inlet opening when the inlet hose is in use.

6. The lawn and garden maintenance equipment of claim 3 wherein an aperture is provided in the front depending sidewall said aperture being suitable to be closed by a removable plug and upon plug removal to accept a debris inlet hose and a removable closure is used to close the air and debris inlet opening when the inlet hose is in use.

7. The lawn and garden maintenance equipment of claim 1 wherein the handle is pivotally mounted for movement into a forward position generally overlying the front of the machine and the exit opening is provided with a deflector to laterally direct air and debris leaving the exit opening thereby to permit use of the equipment as a wheeled blower.

8. The lawn and garden maintenance equipment of claim 6 wherein a screen is removably mounted in the exit opening to assist in reducing the size of leaves and debris exiting there through.

9. The lawn and garden maintenance equipment of claim 2 wherein a limb inlet chute extending generally upwardly is secured to the top closure of the work chamber in communication with the aperture formed therein to assist in feeding limbs and other debris into the apparatus to be chipped by the rotating blade on the disc in the work chamber.

10. The lawn and garden maintenance equipment of claim 3 wherein a limb inlet chute extending generally upwardly is secured to the top closure of the work chamber in communication with the aperture formed therein to assist in feeding limbs and other debris into the apparatus to be chipped by the rotating blade on the disc in the work chamber.

11. Lawn and garden maintenance equipment for collecting and shredding debris and chipping branches and the like comprising:
a housing;
drive means mounted on said housing and having a shaft extending into said housing for rotation about a vertical axis;
a disc mounted on said shaft for rotation therewith and positioned within said housing;
cutting means on the top of said disc for slicing limbs and a slot adjacent said cutting means to permit sliced material to pass through the disc;
blade means mounted on the bottom of said disc to move air and air entrained debris within said housing;
a bottom closure for said housing;
said closure having a portion thereof providing an air and debris inlet opening;
an aperture in said housing radially aligned with said cutting means for accepting limbs and the like to be fed through said housing to engage the cutting means;
an exit opening in said housing generally radially opposite the inlet for air and entrained debris;
and wheels to support said housing for movement along the ground.

12. The lawn and garden maintenance equipment of claim 11 wherein an aperture is provided in the front depending sidewall, said aperture being suitable to be closed by removable plug and upon plug removal to accept a debris inlet hose and a removable closure is used to close the air and debris inlet opening when the inlet hose is in use.

13. The lawn and garden maintenance equipment of claim 11 wherein a debris deflector is positioned in the exit opening and a bag is supported on the handle with the deflector forming the inlet to the bag and arranged to deflect material upwardly into the bag.

14. The lawn and garden maintenance equipment of claim 11 wherein the handle is pivotally mounted for movement into a forward position generally overlying the front of the machine and the exit opening is provided with a deflector to laterally direct air and debris leaving the exit opening thereby to permit use of the equipment as a wheeled blower.

* * * * *